UNITED STATES PATENT OFFICE.

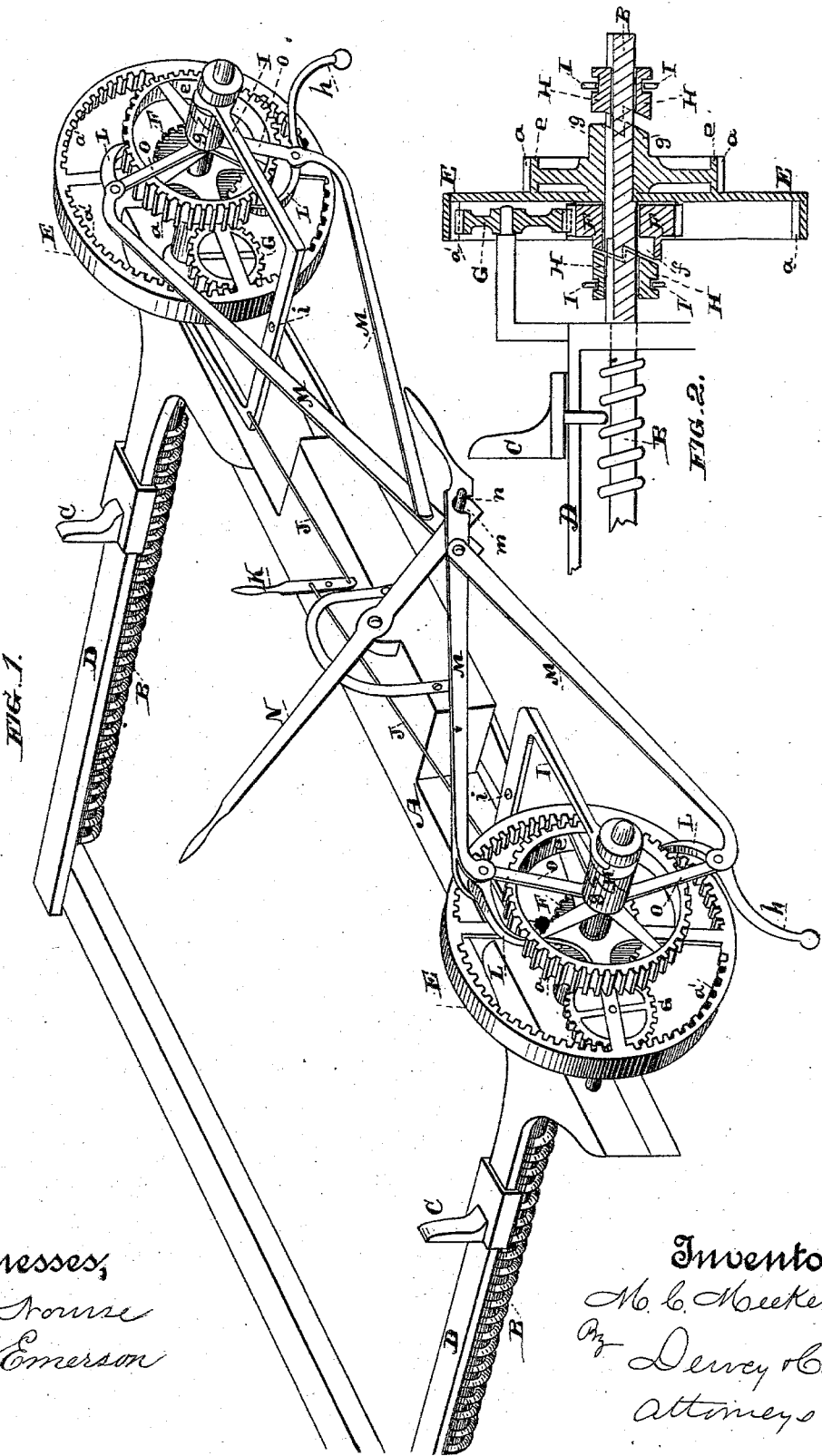

MELVIN C. MEEKER, OF OCCIDENTAL, CALIFORNIA.

HEAD-BLOCK GEAR FOR SAW-MILLS.

SPECIFICATION forming part of Letters Patent No. 281,100, dated July 10, 1883.

Application filed April 21, 1883. (No model.)

*To all whom it may concern:*

Be it known that I, MELVIN C. MEEKER, of Occidental, county of Sonoma, State of California, have invented an Improved Head-Block Gear for Saw-Mills; and I hereby declare the following to be a full, clear, and exact description thereof.

My invention relates to certain improvements in the gear for setting up the head-blocks in saw-mills.

These improvements consist in an arrangement of gears and clutches whereby the pieces, when set up, may be drawn back with rapidity; also, in certain combinations of levers joined to a single lever, and means for disengaging those of either end, together with certain further details of construction, all of which will hereinafter fully appear.

The object of my invention is to provide means for drawing back the knees, after the log has been sawed up, with greater rapidity than they are set up, whereby much time is saved; and, further, to throw either knee out of engagement readily, to set one up farther than the other when the work is of such character as to require it.

Referring to the accompanying drawings, Figure 1 is a perspective view of my invention. Fig. 2 is a section of the gears and clutches.

A is the bed, and B the end screws which operate the knees C, sliding on guides D in the usual manner. Upon the ends of these screws are loosely mounted large gears E E. These are cast in the shape shown, having a flange or offset, *e*, of smaller diameter on the outside, upon which a steel band having teeth *a* is shrunk. Teeth *a'* are formed upon the inside of the outer or larger rim of the gears.

Upon the screws on the inside of the large gears are loosely mounted small pinions F, meshing with an intermediary, G, which meshes with the teeth *a'*.

Upon the hub of the pinions F is cast a clutch, *f*, and a similar clutch, *g*, is cast with the hub of the large gears E on the offset portion *e*.

H H are clutches set upon a feather on the screws. One is outside, and is adapted to engage with the clutch *g*, and the other is inside to engage with the clutch *f*.

I represents a switch-arm. It is pivoted at *i*, and straddles the large gear, its ends embracing the clutches H H. One of these arms is at each end.

With one corner of the arms are connected rods J, extending to a switch-lever, K, and pivoted on each side of its fulcrum, whereby both rods may be operated at once. By operating the lever the switch-arm is swung in either direction to throw the outer clutches into engagement and disengage the inner clutches, or vice versa. Thus, if the outer clutches are thrown into engagement, the large gears affect the screws directly to set up the knees slowly, while if the inner ones are thrown in, the large gears affect the screws through the intermediaries G and the pinions F, whereby power is multiplied and the knees may be drawn back rapidly.

L represents the operating-pawls, either singly or combined in sets. These are mounted in the ends of levers M, and engage with the teeth *a* on the offset or flange *e* of the large gears. The levers M are pivoted to separate links O, loosely mounted on the screws, one above and the other below. The pawls on each gear are so arranged that one shall engage with the teeth *a* at one movement and the other shall engage with them at the reverse movement, and two on one gear are arranged to operate one screw in the same direction as the two on the other gear operate the other screw. The lower pawls are weighted by an arm, *h*, which holds them in engagement without having springs. The levers M are pivoted together in sets of two, and one set is adapted to be fitted on a pin, *n*, on the outer side of the main lever N, and the other set upon the inner side upon the same pin extended through. This is done by a notch, *m*, in the levers, or in any manner which will allow of their ready unshipment. The single lever N thus operates the whole device, causing the pawls L to operate continuously the gears E E, which, by means of the switch and clutch mechanism, may be connected with the screws directly to move the knees forward, or indirectly through the small gears to return them rapidly. When the work requires the two knees to be set up to different distances, I unship one set of levers M and operate the other until the required point is reached, when I again engage the levers and set up both knees. This is useful in sawing telegraph-poles or other tapering work, as the knees may be set to the points desired.

Having thus described my invention, what I claim as new, and desire to secure by Letters Patent, is—

1. In a head-block gear for saw-mills, the screws B and the knees C thereon, in combination with the gears E E, loosely mounted on said screws, and having internal teeth, $a'$, and external teeth, $a$, and a clutch, $g$, the pinions F, loose upon said screws, and having a clutch, $f$, the intermediate gears, G, a clutch mechanism to alternately engage clutches $g f$ and fix said gears E E to the screws, directly or indirectly, through the gears G and pinions F, and a lever and pawl mechanism engaging with teeth $a$ to operate said gears E E, substantially as and for the purpose herein described.

2. In a head-block gear for saw-mills, the screws B and the knees C thereon, in combination with the gears E E, loose upon said screws, and having internal teeth, $a'$, and external teeth, $a$, and a clutch, $g$, the pinions F, loose upon the screws, and having a clutch, $f$, the intermediate gears, G, the clutches H H, upon a feather on said screws, adapted to engage with clutches $g f$, the pivoted switch-arm I, operating both clutches, the rod J and switch-lever K, and a lever and pawl mechanism engaging with teeth $a$ to operate said gears E E, substantially as and for the purpose herein described.

3. In a head-block gear for saw-mills, the screws B and the knees C thereon, in combination with the gears E $e$, loose upon said screws, arranged side by side and having teeth $a' a$, and both rigidly connected with a clutch, $g$, the pinions F, loose upon the screws, operating with the gear E, and having a clutch, $f$, connected with it, the intermediate gears between gear E and pinion F, the clutches H H, feathered to the screws, the pivoted switch-arm I, the rod J and switch-lever K, and a means for operating the gears E E, consisting of the swinging pawls L above and below, the levers M, having their ends pivoted together, and the main lever N, all arranged and operating substantially as and for the purpose herein described.

4. The gears E E, in combination with the swinging pawls L, engaging them, the pawl-levers M, pivoted together in sets of two on each side, and each having a notch, $m$, and main lever N, pivoted to the frame, and having a cross-pin, $n$, engaging both of said notches, substantially as and for the purpose herein described.

In witness whereof I hereunto set my hand.

MELVIN C. MEEKER.

Witnesses:
M. HURD,
J. O. MEEKER.